United States Patent [19]
Sims et al.

[11] 3,914,729
[45] Oct. 21, 1975

[54] UNDERWATER ACOUSTIC SURVEILLANCE OF HARBOR AND CHANNEL AREAS

[75] Inventors: David S. Sims, Ellicott City, Md.; John H. Thompson, Pittsburgh, Pa.

[73] Assignee: The United States of America as represented by the Secretary of the Navy, Washington, D.C.

[22] Filed: Mar. 3, 1960

[21] Appl. No.: 12,652

[52] U.S. Cl. .................................. 340/3 R; 340/5 S
[51] Int. Cl.² ............................................ G01S 9/68
[58] Field of Search .......... 181/.51; 340/5, 2, 3, 5 S, 340/6

[56] References Cited
UNITED STATES PATENTS

| | | | |
|---|---|---|---|
| 948,424 | 2/1910 | Long | 340/2 |
| 1,473,332 | 11/1923 | Benson | 340/3 |
| 2,401,929 | 6/1946 | Hammond, Jr. | 340/3 |
| 2,413,026 | 12/1946 | Mason | 340/6 |
| 2,418,846 | 4/1947 | Meacham | 340/3 |
| 2,431,018 | 11/1947 | Bailey et al. | 340/2 |
| 2,623,116 | 12/1952 | Rymes | 340/3 |
| 2,807,164 | 9/1957 | Rumbaugh | 340/5 |
| 2,861,254 | 11/1958 | Abrams et al. | 340/3 |
| 2,865,014 | 12/1958 | Malm | 340/3 |
| 3,005,973 | 10/1961 | Kietz | 340/6 |

*Primary Examiner*—Richard A. Farley
*Attorney, Agent, or Firm*—Louis A. Miller; Rolla N. Carter

EXEMPLARY CLAIM

1. A catacoustic system for detecting the intrusion of a body in an object field under a water surface at a harbor entrance or the like comprising a high resolution sonar apparatus including a submerged transducer having a vertically oriented fan shape directivity pattern directed at an object field athwart the harbor entrance and having its principal axis slanted towards the water surface, means for periodically pulsing said transducer to radiate pulses, a display medium, and means for receiving flutter echoes of each pulse returned from the water surface and for producing markings at points along a line on said medium varying in position in accord with the range from which said echoes are received, the markings for echoes from successive pulses being produced in line by line correlation, whereby a significant change in the display with time indicates the position of a body intruding in said object field.

3 Claims, 8 Drawing Figures

DAVID S. SIMS
JOHN H. THOMPSON
*INVENTOR.*

BY

*Rolla N. Carter*
ATTORNEYS

UNDERWATER ACOUSTIC SURVEILLANCE OF HARBOR AND CHANNEL AREAS

The present invention relates to the surveillance of harbor and channel areas and more particularly to an active catacoustic system for detecting the intrusion of a body in an object field under a water surface such as the cross section of a ship channel or a harbor entrance.

An object of the invention is to provide a continuous and preferably permanent visible record of the position and depth of a body intruding in an object field under surveillance.

Another object of the invention is to provide a visual display of such an intruding body from which the dimension of a profile of the body in a vertical plane may be observed.

A further object of the invention is to provide information of the velocity of such an intruding body and its probable dimension in its direction of movement.

Ultrasonic detecting and ranging apparatus including means for operating a plan position indicator have been proposed for providing a continuous visual indication of the movement of surface craft and submarine vessels within a given area as viewed from a stationary position at the bottom of a bay or the like. In this and other similar arrangements, reflections from the surface constitute reverberation which becomes the limiting background noise for a system utilizing such a scheme. Under low sea state conditions, the background noise is low and target echoes can be relatively easily detected. However, under adverse surface conditions, target echoes are masked by the reverberation and the system becomes useless at a time when the probability of submarine threat might appropriately be high.

In accordance with the present invention, echoes returned from the surface no longer constitute undesirable reverberation but rather become a well defined function of the presence of a target. Surface returned echoes are converted into useful allies by utilizing a transmitter and a recording receiver with a bottom mounted stationary transmitting and receiver transducer array of high resolution having a fan shape directivity pattern vertically oriented and directed upwardly at an angle to the surface so that it intersects the surface along a line for a considerable distance, the arrangement being such that when the transducer is periodically energized with very short pulses of high frequency wave energy the flutter echoes return from the surface from the region along the line of intersection of the directivity pattern with the surface will arrive at the transducer at a time following the transmission corresponding to the appropriate slant range which returned echoes may be presented by the recording receiver as an intensity modulation of a line trace with the spot position being a function of slant range, the return from each transmitted pulse being presented as a separate line on a suitable recording medium so that the presentation is continuous with time thereby giving an overall presentation with a somewhat "snowy" appearance as in the case of an untuned television receiver. As defined in the American Standards Association booklet "American Standard Acoustical Terminology" approved July 31, 1951, a flutter echo is a rapid succession of reflected pulses resulting from a single initial pulse.

The slice of water traversed by the acoustic energy returned to the receiver constitutes an object field which is scanned each time the transducer is pulsed and which is suitably situated to encompass the area to be kept under surveillance, e.g., athwart a harbor entrance or other ship channel. When the object field is unoccupied, the flutter echo return from the surface will be recorded as low intensity markings substantially uniform along each recorded scan line and will appear somewhat discrete due to the high slant-range resolution provided by the short width of the transmitted pulses. Upon the introduction of a stationary target on or very near the surface, such as a shallow draft boat, the return from such target will appear on successive lines of the recording as a series of higher intensity markings which will be coherent with time and if the successive scan lines are recorded sufficiently close together these high intensity marks will merge and appear as a continuous line in the background of "snow". Since the slice of water included in the object field will be quite thin compared to the length of any target of interest, then for most cases of a moving target intruding in the object field the target return will also appear on the recording as a straight line with a length depending on the time interval the target remains in the object field. By arranging two surveillance systems with their object fields parallel and laterally spaced a known distance apart, information is made available with respect to direction of travel, velocity and length of a moving target since the time required to pass from one object field to the other would constitute a measure of the target velocity and the time spent within either object field would in connection with the velocity constitute a measure of the target length. The acoustic return from a submerged target in the object field will appear as a straight line of high intensity as in the case of a surface target; however, its presence will produce an acoustic shadow on the ocean surface which will serve as an additional identifying property and will in many cases constitute the prominent means of identification including its submerged depth.

It becomes obvious from the above discussion of the present system that the detection of a submerged target would be improved under high sea state conditions which would normally be considered adverse and eventually limit the usefulness of systems utilizing more conventional techniques. The presentation background snow would increase for the higher sea states and hence the target shadow would be enhanced as a result of the higher contrast. For the other extreme where the sea is calm, the background presentation due to the surface return would be low and consequently the shadow would not be so nearly pronounced. However, for this latter case the direct target return appearing as a straight bright line would be easily detectable in the presence of the low background. In cases where the ocean surface conditions fall between the two extremes, then one could use both the direct target return and the target shadow to advantage for identification. It is pertinent to point out that for large surface craft with normal draft one would see in the display the direct target return followed almost immediately in range by the shadow.

Other objects and advantages of the invention will be apparent from the following description when read in connection with the accompanying drawing in which.

The fundamental plan is to have a transmit-receive transducer array submerged in water at a known depth and having a fan shape directivity pattern coinciding with a fixed object field, including the water surface, desired to be watched for the intrusion of a body therein and an associated surface unit for periodically pulsing the transducer array and recording the echoes returned from the water surface a line at a time for each pulse transmitted whereby significant differences in the returned echoes will appear on the recording medium as a well-defined function of an intruding body.

Figure 1:
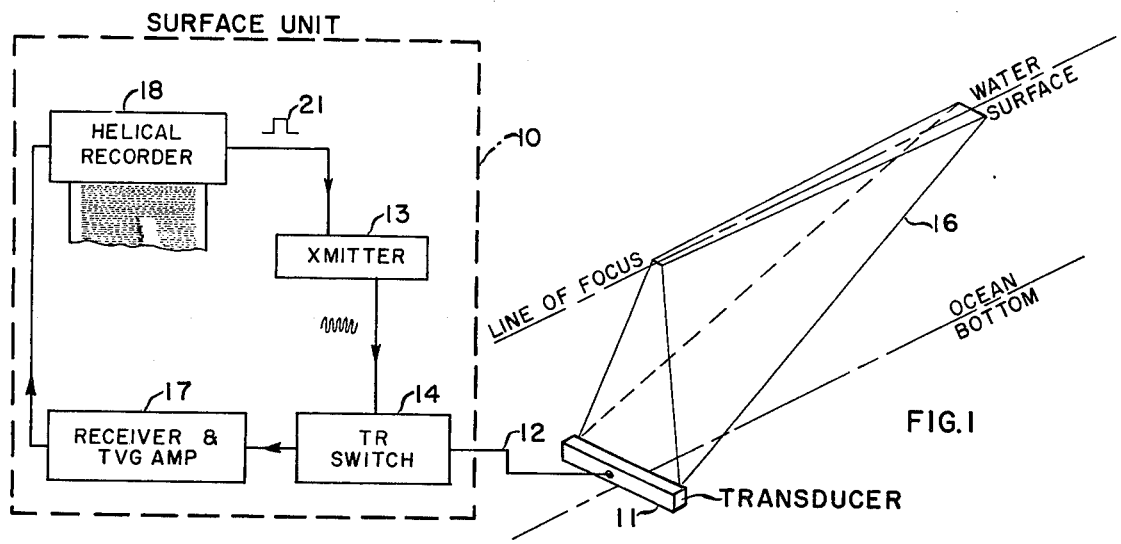
FIG. 1 is a schematic view partly in perspective of a preferred embodiment of the invention.

The preferred embodiment of the invention shown in FIG. 1 illustrates a catacoustic system comprising a surface unit 10 and a submerged transducer 11 which may be suitably mounted on an ocean bottom with the principal axis of its directivity pattern slanted toward the surface. The transducer 11 may be of any high resolution type having a fan shape pattern but it preferably is of the focused type disclosed to us by C. H. Jones. The transducer so disclosed is elongated along a circle of latitude having a radius equal to the distance from a plane surface the transducer is to operate so that when it is energized in phase it transmits compressional wave energy focused along a narrow strip on the plane surface, i.e., along the polar axis defined by such circle of latitude. FIG. 1 shows in exaggerated perspective a typical beam from such a transducer oriented on the ocean bottom such that its line of focus falls on the ocean surface. As can be noted, the energy from the transducer 11 converges to the line of focus and hence resolution is obtainable which is smaller than the dimension of the transducer.

The surface unit 10 connected to the transducer 11 by a cable 12 is located on any suitable fixed platform either ashore or afloat and as shown in FIG. 1 includes a transmitter 13 which through a transmit-receive switch 14 periodically energizes the transducer 11 to emit short pulses 15 (FIGS. 2 and 3) of compressional wave energy in the focused directivity pattern indicated by the reference character 16 and with its line of focus falling along the water surface. Separate transducers for transmitting and receiving may of course be employed. The intersection of each pulse 15 with the water surface wipes or travels outwardly along the surface so that the return echo signal due to surface reflection is comparable to that received from flying spot scanning. This echo signal received by the transducer 11 is passed by the TR switch 14 to a receiver 17 which includes a time varied gain amplifier for the well known purpose of maintaining substantially constant the receiver output voltage for application to a display device which may be a cathode ray oscilloscope or as here shown a helical recorder 18 which records the received signals from each pulse along a single line on a suitable record medium 19. The elapsed time between the transmission of the pulse and a return signal is a function of the range of the point along the surface reflecting the return signal and therefore by suitable synchronization of the recorder 18 and with a variable pitch helix each point along the length of a line recorded on the record medium 19 is correlated along its length with the slant range along the water surface. Such synchronization may be accomplished in a known manner by having a rotating element of the helical recorder 18 generate and apply to the transmitter 13 a synchronizing pulse 21. The display presented on the record medium 19 is believed to be most easily interpretable if the record medium 19 is advanced at a rate such that successive lines are recorded thereon in substantially contiguous relation.

Figures 2, 3:
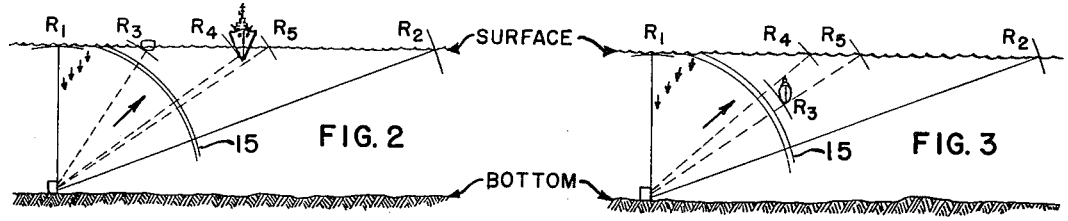
FIGS. 2 and 3 are schematic representations indicating possible operational environments of the surveillance system of FIG. 1.
Figures 2A, 3A:
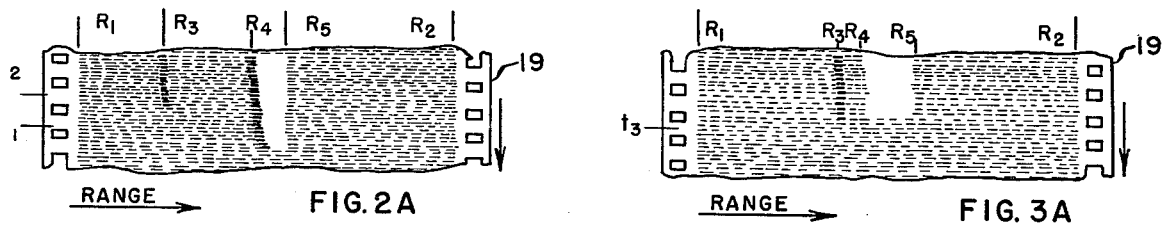
FIGS. 2A and 3A show, respectively, fragments of display records which could result from the situations shown in FIGS. 2 and 3.
Figure 4:
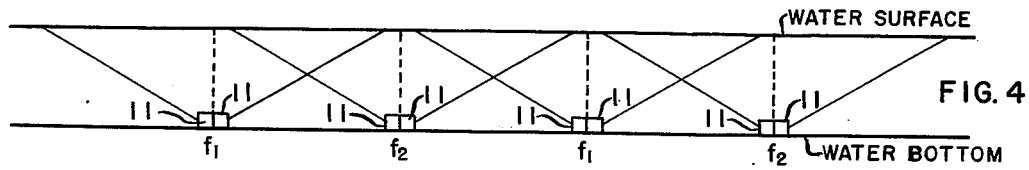
FIGS. 4 and 5 are schematic views showing two possible arrangements which may be utilized to extend the object field being watched.
Figure 5:
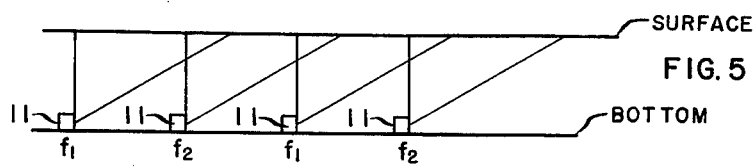

As was above indicated, the receiver 17 is adjusted so that the relatively weak signals derived from surface reflections will be lightly recorded on the record medium 19 whereas stronger signals from intruding bodies will be more heavily recorded and there will be no signal when the intruding body casts an acoustic shadow on the surface. These relationships will be more clearly envisioned by referring to FIGS. 2 and 3 and their corresponding fragmentary recordings shown respectively in FIGS. 2A and 3A. In each of FIGS. 2 and 3, a transmitted pulse 15 is shown traveling outward as indicated by the large arrow and the return or flutter echoes from the surface are indicated by a plurality of small arrows. The return from the pulse 15 between slant ranges $R_1$ and $R_3$ is from the surface and thus appears as low intensity markings on the record medium 19. At slant range $R_3$, the return is from a shallow draft boat in the object field and will appear as high intensity markings; thereafter the return between slant ranges $R_3$ and $R_4$ is from the surface and will appear as low intensity markings on the record medium 19. A deep draft vessel at slant range $R_4$ will appear as high intensity markings and immediately thereafter the record medium will be blank until echoes are received from the surface at slant range $R_5$ corresponding to the acoustic shadow cast by the intruding vessel's hull, i.e., the time interval between when the transmitted pulse 15 passes the vessel's keel and again strikes the surface at $R_5$. Between slant ranges $R_5$ and the farthest range recorded, $R_2$, no body appears in this portion of the object field and the record medium 19 displays low intensity markings indicative of surface reflections. The particular display illustrated in FIG. 2A indicates that the large vessel at slant range $R_4$ intruded in the object field at time $t_1$ and the shallow draft boat at range $R_3$ intruded at time $t_2$. FIG. 3 illustrates a submerged body in the object field which will be displayed on the record medium 19 as indicated in FIG. 3A. By interpreting FIG. 3A, the situation indicated in FIG. 3 can be reconstructed as follows: at time $t_3$, a body intruded in the object field at slant range $R_3$; this body was submerged to a depth which is a function of slant range $R_3$ to $R_4$ and had a vertical dimension in profile which is a function of the distance between slant ranges $R_4$ and $R_5$, here again $R_2$ representing the longest slant range recorded.

Where it is desired to keep under surveillance an extended object field beyond the practical range of a single surveying system as above described, a plurality of transducers may be placed back to back in pairs as indicated in FIG. 4, alternate pairs of the transducers 11 being preferably operated at different frequencies such as $f_1$ and $f_2$ so as to reduce cross talk between neighboring pairs. Another layout for the transducers 11 is shown in FIG. 5 wherein a plurality of single transducers 11 are positioned so that their object fields extend in a single direction and overlap sufficiently to provide the desired coverage and again are preferably operated at frequencies different from that of their immediate neighbors.

Figure 6:
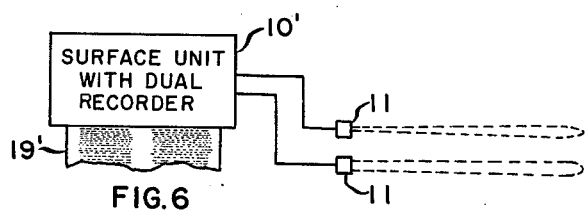
FIG. 6 is a schematic plan view of two object fields being watched in parallel.

As was pointed out above, considerable information can be realized from the recording such as shown in FIGS. 2A and 3A; however, no reliable information can be obtained with respect to velocity or length of an intruding body. By utilizing an installation comprising two surveillance systems as above described positioned with their object fields laterally spaced a known distance apart as shown in FIG. 6, additional useful information is obtainable if the two spaced transducers 11 of these two systems scan their respective object fields simultaneously with the return signals separately recorded in known time relation as by a surface unit 10' provided with a dual recorder which marks the values of the two scansions along parallel strips of a record medium 19'. Thus, the time required for an intruding object to pass from one object field to the other constitutes a measure of the velocity of the intruding body and the time spent within either object field would in connection with velocity constitute a measure of the length of the intruding body; the direction of movement of the intruding body being readily determined from the sequence of movement from one object field to the other.

The above description of the functioning of the apparatus assumed that a body intruding in an object field being watched would provide a more highly reflecting target than the water surface. It is known that acoustic absorptive coatings are constantly being sought for use on submarines and the like in an effort to reduce their target strength and hence make them more difficult to detect and it is possible that such coatings may be developed which would be effective enough to reduce the direct return from such a coated surface to a level which would be masked by the background. Under such conditions, systems depending only on the target return or echo would become useless. However, such a coated submarine would still produce a prominent shadow that would furnish positive identification in the system described herein. In fact, if the acoustic coating was effective to absorb 100% of the impinging energy, the submarine would still cast a prominent shadow. The same would be true of any acoustically opaque or perhaps translucent body whose acoustic impedance was properly matched to that of the water so as to reduce its target strength.

From the foregoing detailed description, it will be apparent that the present invention provides an intrusion detecting system which in addition to indicating the mere presence of an intruder in an object field and its time of arrival and departure, provides a visual display from which significant information with respect to dimension and whether and to what degree submerged can be extracted at a glance. Further, the underwater surveillance system provided by the invention functions satisfactorily regardless of sea state and employs surface reflections as a well defined function of the presence of an intruder rather than as heretofore trying to design-out surface reflections as undesirable reverberation.

While for the purpose of disclosing the invention preferred embodiments thereof have been described in detail, many modifications and variations are possible and will become readily apparent to those skilled in the art from the foregoing description which is intended to be illustrative only and the scope of the invention is defined in the appended claims.

What is claimed as new and desired to be secured by Letters Patent of the United States is:

1. A catacoustic system for detecting the intrusion of a body in an object field under a water surface at a harbor entrance or the like comprising a high resolution sonar apparatus including a submerged transducer having a vertically oriented fan shape directivity pattern directed at an object field athwart the harbor entrance and having its principal axis slanted towards the water surface, means for periodically pulsing said transducer to radiate pulses, a display medium, and means for receiving flutter echoes of each pulse returned from the water surface and for producing markings at points along a line on said medium varying in position in accord with the range from which said echoes are received, the markings for echoes from successive pulses being produced in line by line correlation, whereby a significant change in the display with time indicates the position of a body intruding in said object field.

2. A catacoustic system in accordance with claim 1 wherein there are at least two high resolution sonar apparatus directed at two object fields laterally spaced a known distance, whereby the time interval between intrusion in one object field and intrusion in the second object field indicates velocity of the intruding body.

3. A catacoustic system in accordance with claim 1 wherein said transducer has a line of focus lying substantially in the plane of the water surface.

* * * * *